Patented Oct. 18, 1927.

1,645,791

UNITED STATES PATENT OFFICE.

ROY H. BROWNLEE, OF PITTSBURGH, PENNSYLVANIA.

DENTIFRICE.

No Drawing. Original application filed August 27, 1924, Serial No. 734,513. Divided and this application filed October 12, 1926. Serial No. 141,243.

This invention relates to a dentifrice, and the present is in part a continuation of application Serial No. 734,513, filed August 27, 1924.

The object of the invention is to provide a dentifrice which has no injurious effect upon the tissues or glands of the mouth, and which possesses certain particularly advantageous properties for cleansing the teeth and gums and for the general care of the oral cavity.

A problem encountered in compounding a satisfactory dentifrice is to provide a substance which thoroughly cleanses the teeth; but which contains no gritty substance capable of wearing away the enamel of the teeth, and no ingredient capable of exerting a solvent action thereon.

A corollary function of a complete dentifrice is to dissolve and completely remove oils, fats, and mucin from the teeth; thus preventing the formation of tartar and other deposits, and exposing the actual surface of the teeth to direct contact of the cleansing instrument to secure a thorough cleansing thereof.

A still further desirable property of a dentifrice is to be capable of exerting a mild antiseptic action, thus retarding the increase of bacteria within the oral cavity without injuring the tissues of the mouth or gums.

The dentifrice of the present invention meets these requirements by the incorporation therein of a substance which acts as a solvent of fats, oils, and mucin; and which has a mild antiseptic effect, without injuring the teeth or tissues or imparing the flow or alkalinity of the saliva.

One substance having these desirable properties for use in a dentifrice is the polyhalide of methane, carbon tetrachloride or tetrachlor methane ($CCl_4$).

As used in a dental cream, this active ingredient is combined with relatively inert substances which provide filling material.

The following formula, involving carbon tetrachloride, is one which has been found to give satisfactory results:

| | Grams. |
|---|---|
| Calcium carbonate (prepared chalk) | 100 |
| Magnesium carbonate | 50 |
| Tetra-chlor-methane | 30–40 |
| White mineral oil (highly refined petroleum oil of the lubricating grade) | 40–50 |
| Oil of anise | 5 |
| Eucalyptol | 2–3 |
| Menthol | 1 |
| Sodium chloride | 2–3 |
| Soap | 10 |
| Glycerine | 145 |
| Water | 145 |

It should be understood that the formula given above is illustrative only, and that the ingredients other than the carbon tetrachloride may be varied in order to provide a dental cream of any desired consistency and flavor. The amount of carbon tetrachloride may also be varied, and, as this substance is harmless, it may be included in as great an amount as will remain in a uniform mechanical mixture with the other ingredients of the composition. There is also no definite lower limit to the amount of this substance which may be used, as any appreciable quantity will exert a beneficial effect. In order that the most advantageous results may be obtained, however, it is desirable that the amount of carbon tetrachloride in the composition should be from one-twentieth of the total weight of the composition to an amount as great as may be retained in satisfactory condition therein.

Other halides of methane itself may be used instead of the carbon tetrachloride, and halides of the other members of the series may also be substituted therefor.

Of the other halides of methane, di-iodo methane may be used in the composition if so desired. Of the tri-halides of methane, chloroform may be used, but bromoform ($CHBr_3$) and iodoform, as commercially avaliable, have too penetrating and unpleasantly pungent an odor to render their use in a dentifrice desirable. Although chloroform may be used, its high rate of evaporation renders it a less desirable ingredient than carbon tetrachloride. It should be understood that in this connection the chloroform is included for its solvent and cleansing properties. Its antiseptic action is only of secondary importance, while its anæsthetic properties are wholly foreign to the purposes of the dentifrice.

Of the tetrahalides of methane, tetrachlor methane has been given above as the substance of greatest general suitability, because of its physical properties and ready availability. Of the other tetrahalides, carbon tetrabromide ($CBr_4$) and carbon tetraiodide ($CI_4$), the tetraiodide possesses physical properties which render its use possible and desirable in a dentifrice.

Of the halides of the higher members of the paraffin series various members may also be advantageously untilized. Not only the monohalides of the paraffin series, but also the di-halides and poly-halides of the series may be employed when their physical properties render them suitable for use in a dentifrice.

The halogen substitution products of several of the ethylene series of hydrocarbons may also be used instead of carbon tetrachloride in a dentifrice. Of these the most suitable members are ethylene chloride ($C_2H_4Cl_2$) and methylene chloride ($C_2H_4Cl_2$). A number of the halides of the acetylene series also possess suitable characteristics.

It should be understood that a number of the halides of both the saturated and unsaturated series, which have physical properties rendering them suitable, are relatively so rare that their use in a dentifrice is rendered commercially impractical.

It should also be understood that odor, or taste, as well as boiling point, is of importance in considering the desirability of any compound from the view point of its physical properties. Thus many of the bromides have such a penertating and disagreeable odor that their use is in effect precluded by the impossibility of using flavoring matter which will cover or neutralize the same.

While the specific gravities of the substances vary considerably, it may be stated generally of all of them that the best results are obtained by using an amount in excess of one-twentieth by weight of the total composition.

A halide which presents many desirable characteristics is ethyl iodide ($C_2H_5I$). This substance corresponds rather closely to the carbon tetrachloride, but exerts a slightly greater antiseptic effect.

In regard to any of these substances, it may be stated as a general principle that the more desirable are those having a boiling point between twenty-five degrees centigrade and one hundred and fifty degrees centigrade. To express the matter differently, the more desirable are those which are liquids at room temperature and atmospheric pressure. The compounds having a boiling point lower than twenty-five degrees centigrade tend to evaporate from or separate in the composition, while those which are solid at ordinary temperatures and pressures are too inactive to impart the desired qualities to the dentifrice.

With a dental paste, such as that the formula for which is given above, both the chloride and the iodide may be included. In such case it may be economical to use a greater proportion of the chloride; for example to include thirty grams of the chloride and ten grams of the iodide.

A satisfactory procedure in making the dental cream consists in mixing the white mineral oil and the liquid halide. They may then be added to the solid constituents of the dentifrice, such as calcium carbonate and magnesium carbonate, which absorb them. The other constituents such as glycerine, soap solution, and water, to which the flavoring matter may have been previously added, are then added to the solid constituents, with the absorbed ingredients, to produce a dentifrice having a pasty consistency.

In addition to the dental cream, one or more halogen substitution products of hydrocarbons may be used in liquid form to secure an occasional thorough cleansing of the teeth. One such liquid may consist merely of a mixture of tetrachlor methane and ethyl iodide. To such mixture, the white mineral oil may be added, if so desired, to retard evaporation of these volatile liquids. A satisfactory formula for such liquid may be given as follows:

Grams.
Tetrachlor methane_____ 3
Ethyl iodide_____ 1
White mineral oil_____ 4

While white mineral oil is highly desirable because of its lack of taste and odor, various other mineral, animal, or vegetable oils may be substituted for it. For example highly refined olive oil or cottonseed oil may be satisfactorily used as a carrier for the organic halide.

It should be understood that the scope of the invention is not to be limited to specific substances or proportions given above, but that the general disclosure contained herein is to be construed as restricted only by the limitations contained in the claims appended hereto.

What I claim is:

1. A dentifrice comprising carbon tetrachloride as its principal active ingredient.

2. A dentifrice comprising as its chief active ingredient and as a solvent of organic matter a halide of an aliphatic hydrocarbon having its boiling point between the limits of twenty-five degrees centigrade and one hundred fifty degrees centigrade.

3. A dentifrice comprising as its chief active ingredient and as a solvent of organic matter a chloride of an aliphatic hydrocarbon having its boiling point between the limits of twenty-five degrees centigrade and one hundred fifty degrees centigrade.

4. A dental cream comprising carbon tetrachloride, filling material, and a white mineral oil.

5. A dental cream comprising as its chief active ingredient and as a solvent of organic matter a halide of an aliphatic hydrocarbon having its boiling point between the limits of twenty-five degrees centrigrade and one hundred fifty degrees centigrade, filling material, and a white mineral oil.

6. A dentifrice comprising carbon tetrachloride in an amount constituting no less than one-twentieth by weight of the total composition.

7. A dentifrice comprising as its chief active ingredient and as a solvent of organic matter a halide of an aliphatic hydrocarbon having its boiling point between the limits of twenty-five degrees centigrade and one hundred fifty degrees centigrade in an amount constituting no less than one-twentieth by weight of the total composition.

8. A dentifrice comprising as its chief active ingredient and as a solvent of organic matter a chloride of an aliphatic hydrocarbon having its boiling point between the limits of twenty-five degrees centigrade and one hundred fifty degrees centigrade in an amount constituting no less than one-twentieth by weight of the total composition.

9. A dental cream comprising carbon tetrachloride in an amount no less than one-twentieth by weight or the total composition, filling material, and a white mineral oil.

10. A dental cream comprising as its chief active ingredient and as a solvent of organic matter a halide of an aliphatic hydrocarbon having its boiling point between the limits of twenty-five degrees centigrade and one hundred fifty degrees centigrade in an amount no less than one-twentieth by weight of the total composition, filling material, and a white mineral oil.

11. A dental cream comprising as a solvent of organic matter a chloride of an aliphatic hydrocarbon having its boiling range between the limits of twenty-five degrees centigrade and one hundred fifty degrees centigrade, in an amount no less than one-twentieth by weight of the total composition, filling material and a white mineral oil.

12. A dental preparation comprising carbon tetrachloride as an active agent, and an oleaginous carrier for the carbon tetrachloride.

13. A dental preparation comprising carbon tetrachloride as an active agent, and a white mineral oil as a carrier for the carbon tetrachloride.

14. A dentifrice comprising as its chief active ingredient and as a solvent of organic matter a halide of an aliphatic hydrocarbon which is liquid at room temperature and atmospheric pressure.

15. A dentifrice comprising as its chief active ingredient and as a solvent of organic matter a chloride of an aliphatic hydrocarbon which is liquid at room temperature and atmospheric pressure.

16. A dental cream comprising as its chief active ingredient and as a solvent of organic matter a halide of an aliphatic hydrocarbon which is liquid at room temperature and atmospheric pressure, filling material, and a white mineral oil.

17. A dentifrice comprising as its chief active ingredient and as a solvent of organic matter a halide of an aliphatic hydrocarbon which is liquid at room temperature and atmospheric pressure, said halide being present in an amount no less than one-twentieth by weight of the total composition.

18. A dentifrice comprising as its chief active ingredient and as a solvent of organic matter a chloride of an aliphatic hydrocarbon which is liquid at room temperature and atmospheric pressure, said chloride being present in an amount no less than one-twentieth by weight of the total composition.

19. A dental cream comprising as its chief active ingredient and as a solvent of organic matter a halide of an aliphatic hydrocarbon which is liquid at room temperature and atmospheric pressure, in an amount no less than one-twentieth by weight of the total composition.

20. A dental cream comprising as its chief active ingredient and as a solvent of organic matter a chloride of an aliphatic hydrocarbon which is liquid at room temperature and atmospheric pressure, in an amount no less than one-twentieth by weight of the total composition, filling material, and a white mineral oil.

In witness whereof, I hereunto set my hand.

ROY H. BROWNLEE.